US009655088B2

(12) United States Patent
Xu et al.

(10) Patent No.: US 9,655,088 B2
(45) Date of Patent: May 16, 2017

(54) UTILIZING UNUSED UPLINK SEQUENCE SHIFTS FOR SIGNALING

(71) Applicant: QUALCOMM Incorporated, San Diego, CA (US)

(72) Inventors: Hao Xu, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 14/254,429

(22) Filed: Apr. 16, 2014

(65) Prior Publication Data

US 2014/0313997 A1   Oct. 23, 2014

Related U.S. Application Data

(60) Provisional application No. 61/813,085, filed on Apr. 17, 2013.

(51) Int. Cl.
*H04W 72/04* (2009.01)
*H04J 13/00* (2011.01)
*H04J 13/16* (2011.01)
*H04L 27/26* (2006.01)

(52) U.S. Cl.
CPC ....... *H04W 72/0413* (2013.01); *H04J 13/004* (2013.01); *H04J 13/16* (2013.01); *H04L 27/2613* (2013.01); *H04J 2211/005* (2013.01)

(58) Field of Classification Search
None
See application file for complete search history.

(56) References Cited

U.S. PATENT DOCUMENTS

| | | | |
|---|---|---|---|
| 2005/0041589 A1* | 2/2005 | Kwon ................ | H04W 52/286 370/236 |
| 2005/0254465 A1* | 11/2005 | Lundby ................ | H04L 1/0002 370/335 |
| 2008/0075184 A1* | 3/2008 | Muharemovic ....... | H04L 1/1854 375/260 |

(Continued)

FOREIGN PATENT DOCUMENTS

| | | | | |
|---|---|---|---|---|
| CN | WO 2013134891 A1 * | 9/2013 | ............ | H04L 5/005 |
| FI | WO 2013050449 A1 * | 4/2013 | ............ | H04B 7/024 |

(Continued)

OTHER PUBLICATIONS

International Search Report and Written Opinion—PCT/US2014/034444—ISA/EPO—Sep. 5, 2014.

(Continued)

*Primary Examiner* — Chi H Pham
*Assistant Examiner* — Vladislav Agureyev
(74) *Attorney, Agent, or Firm* — Patterson & Sheridan, LLP

(57) ABSTRACT

Certain aspects of the present disclosure propose methods and apparatus for signaling information via the selection of resources used for an uplink transmission. The aspects may include selecting one or more cyclic shifts or orthogonal cover codes used to transmit an uplink channel. The one or more cyclic shifts or orthogonal cover codes may be selected to convey information. The information may be conveyed by transmitting the uplink channel using the selected cyclic shifts or orthogonal cover codes.

28 Claims, 6 Drawing Sheets

(56) References Cited

U.S. PATENT DOCUMENTS

| | | | | |
|---|---|---|---|---|
| 2008/0212524 | A1* | 9/2008 | Niwano | H04L 47/10 370/329 |
| 2008/0298433 | A1* | 12/2008 | Tiirola | H04J 13/0062 375/132 |
| 2009/0168911 | A1* | 7/2009 | Park | H04B 7/063 375/260 |
| 2009/0213750 | A1* | 8/2009 | Gorokhov | H04W 72/1231 370/253 |
| 2010/0069122 | A1* | 3/2010 | Ito | H04B 7/0684 455/562.1 |
| 2010/0091735 | A1* | 4/2010 | Kim | H04L 1/0041 370/331 |
| 2010/0279625 | A1* | 11/2010 | Ko | H04B 7/0691 455/68 |
| 2011/0041021 | A1* | 2/2011 | Khoshnevis | H04L 1/1819 714/748 |
| 2011/0083066 | A1* | 4/2011 | Chung | H03M 13/09 714/807 |
| 2011/0206089 | A1* | 8/2011 | Cho | H04B 1/707 375/141 |
| 2011/0317596 | A1* | 12/2011 | Jongren | H04L 5/0053 370/280 |
| 2012/0033587 | A1 | 2/2012 | Papasakellariou et al. | |
| 2012/0184312 | A1* | 7/2012 | Yamamoto | H04J 11/0053 455/502 |
| 2012/0250663 | A1* | 10/2012 | Han | H04L 1/06 370/336 |
| 2012/0257513 | A1* | 10/2012 | Yamada | H04L 1/0618 370/248 |
| 2013/0090146 | A1* | 4/2013 | Kwon | H04W 52/365 455/509 |
| 2013/0115966 | A1* | 5/2013 | Kang | H04W 72/0406 455/450 |
| 2013/0128761 | A1* | 5/2013 | Kang | H04W 72/046 370/252 |
| 2013/0163537 | A1* | 6/2013 | Anderson | H04W 72/1284 370/329 |
| 2013/0301467 | A1* | 11/2013 | Kang | H04B 7/024 370/252 |
| 2014/0064213 | A1* | 3/2014 | Guo | H04L 5/0048 370/329 |
| 2014/0206406 | A1* | 7/2014 | Cordeiro | H04W 72/046 455/501 |
| 2015/0381246 | A1* | 12/2015 | Huang | H04B 7/0456 370/329 |

FOREIGN PATENT DOCUMENTS

| | | | |
|---|---|---|---|
| IN | WO 2009157729 A2 * | 12/2009 | H04L 1/1812 |
| KR | 20120084243 A * | 7/2012 | H04B 7/024 |
| WO | WO-2013050449 A1 | 4/2013 | |

OTHER PUBLICATIONS

Nam Y H., et al., "Evolution of reference signals for LTE-advanced systems", IEEE Communications Magazine, IEEE Service Center, Piscataway, US, vol. 50, No. 2, Feb. 1, 2012 (Feb. 1, 2012), pp. 132-138, XP011417049, ISSN: 0163-6804, DOI:10.1109/MCOM.2012.6146492.

* cited by examiner

UTILIZING UNUSED UPLINK SEQUENCE SHIFTS FOR SIGNALING

CROSS-REFERENCE TO RELATED APPLICATIONS

The present Application for patent claims priority to U.S. Provisional Application No. 61/813,085, filed Apr. 17, 2013, which is assigned to the assignee of the present application and hereby expressly incorporated by reference herein in its entirety.

BACKGROUND

Field

Certain embodiments of the present disclosure generally relate to wireless communications and, more particularly, to utilizing unused uplink (UL) sequence shifts for signaling.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station. In an FDD system, forward and reverse link transmissions are on different frequency regions.

The main focus of traditional LTE design is on the improvement of spectral efficiency, ubiquitous coverage, enhanced quality of service (QoS) support, and the like. This typically results in high end devices, such as the state-of-art smart phones, tablets, etc. However, low cost, low rate devices need to be supported as well. Some market projections show that the number of low cost devices may largely exceed number of today's cell phones.

SUMMARY

Certain aspects of the present disclosure provide a method for wireless communications by a user equipment (UE). The method generally includes selecting one or more cyclic shifts or orthogonal cover codes used to transmit an uplink channel, wherein the one or more cyclic shifts or orthogonal cover codes are selected to convey information, and conveying the information by transmitting the uplink channel using the selected cyclic shifts or orthogonal cover codes.

Certain aspects of the present disclosure provide a method for wireless communications by a base station (BS). The method generally includes detecting one or more cyclic shifts or orthogonal cover codes used by a user equipment (UE) to transmit an uplink channel and identifying information that is conveyed in the uplink channel, based on the detected cyclic shifts or orthogonal cover codes.

Certain aspects of the present disclosure also provide various apparatuses and program products for performing the above methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
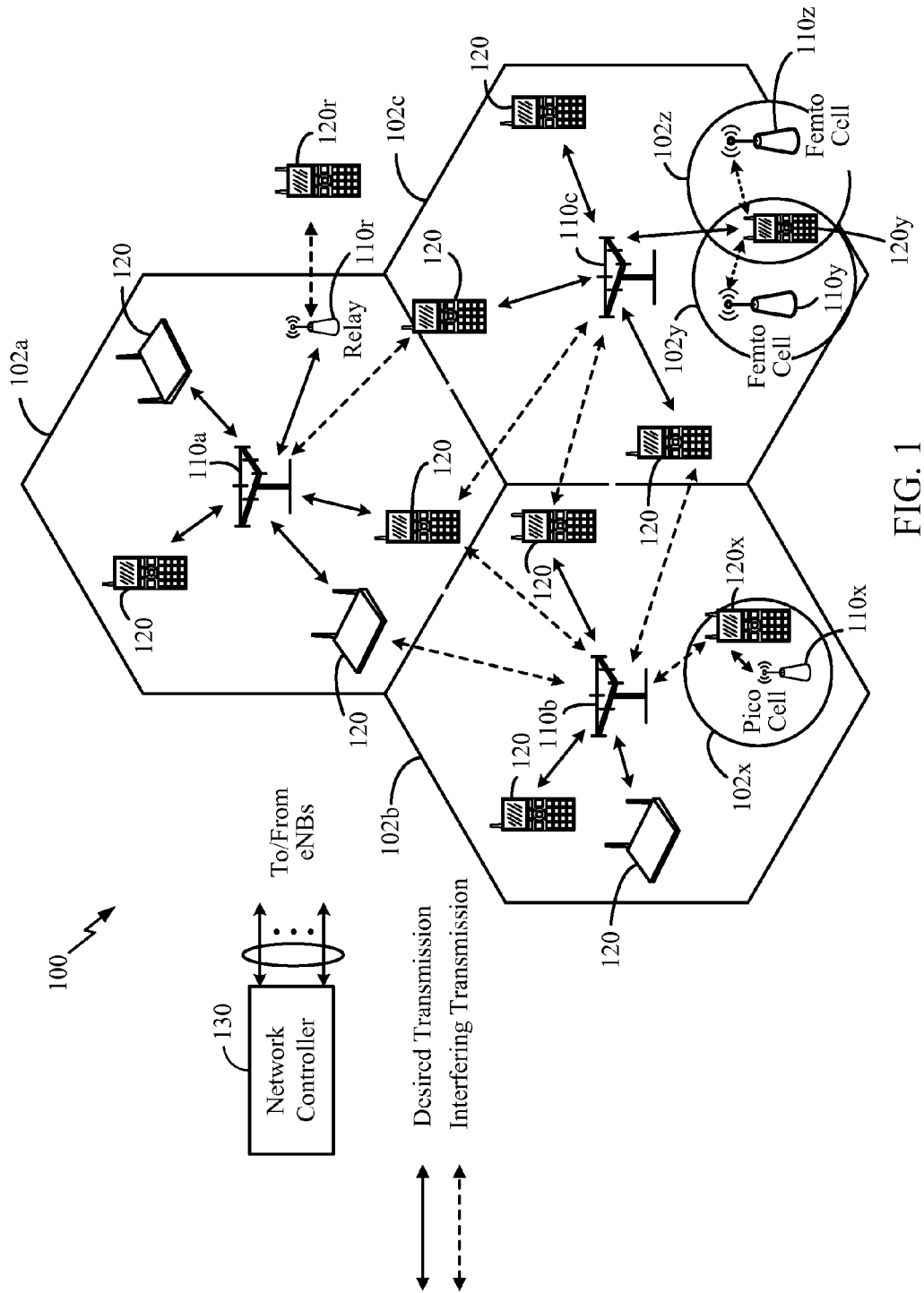
FIG. 1 illustrates a wireless communications network in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, software/firmware, a combination of hardware and software/ firmware, or software/firmware in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a smart phone, a tablet, an ultrabook, a netbook, a smartbook, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE/LTE-Advanced (LTE-A), and LTE/LTE-A terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, global positioning system (GPS), ultra wide band (UWB), radio frequency identification (RFID), and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Example Wireless Communication System

FIG. 1 shows a wireless communication network 100 in which aspects of the present disclosure may be utilized.

The wireless communication network 100 may be an LTE network. The wireless communication network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidths of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidths of 1.25, 2.5, 5, 10, or 20 MHz, respectively.

Aspects of the present disclosure may be utilized to signal information from one network entity to another. For example, such aspects may be used to signal information from any of the UEs 120 to a serving eNB 110.

Figure 2:
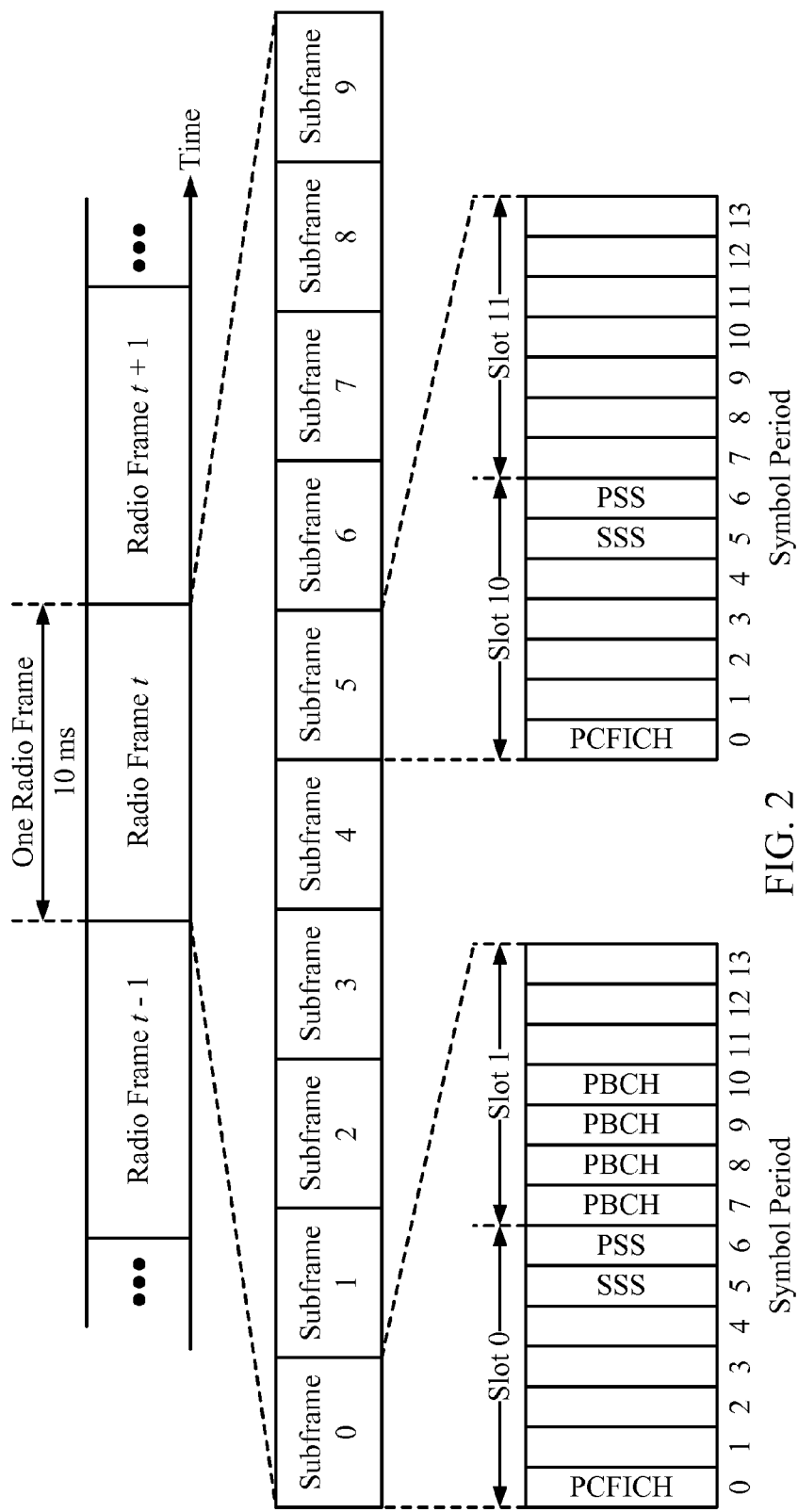
FIG. 2 illustrates a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. The real or complex value may be used to explicitly convey one or more bits of information. As described in further detail below, according to certain aspects of the present disclosure, information may also be implicitly conveyed via the selection of certain resources used for transmission (e.g., orthogonal cover codes or cyclic shifts).

Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Aspects of the present of the present disclosure may be utilized for communication during downlink transmissions. For example, such aspects may be used to communicate information from an eNB 110 to a UE 120 in a PDCCH, PDSCH, or other downlink channel.

Figure 2A:
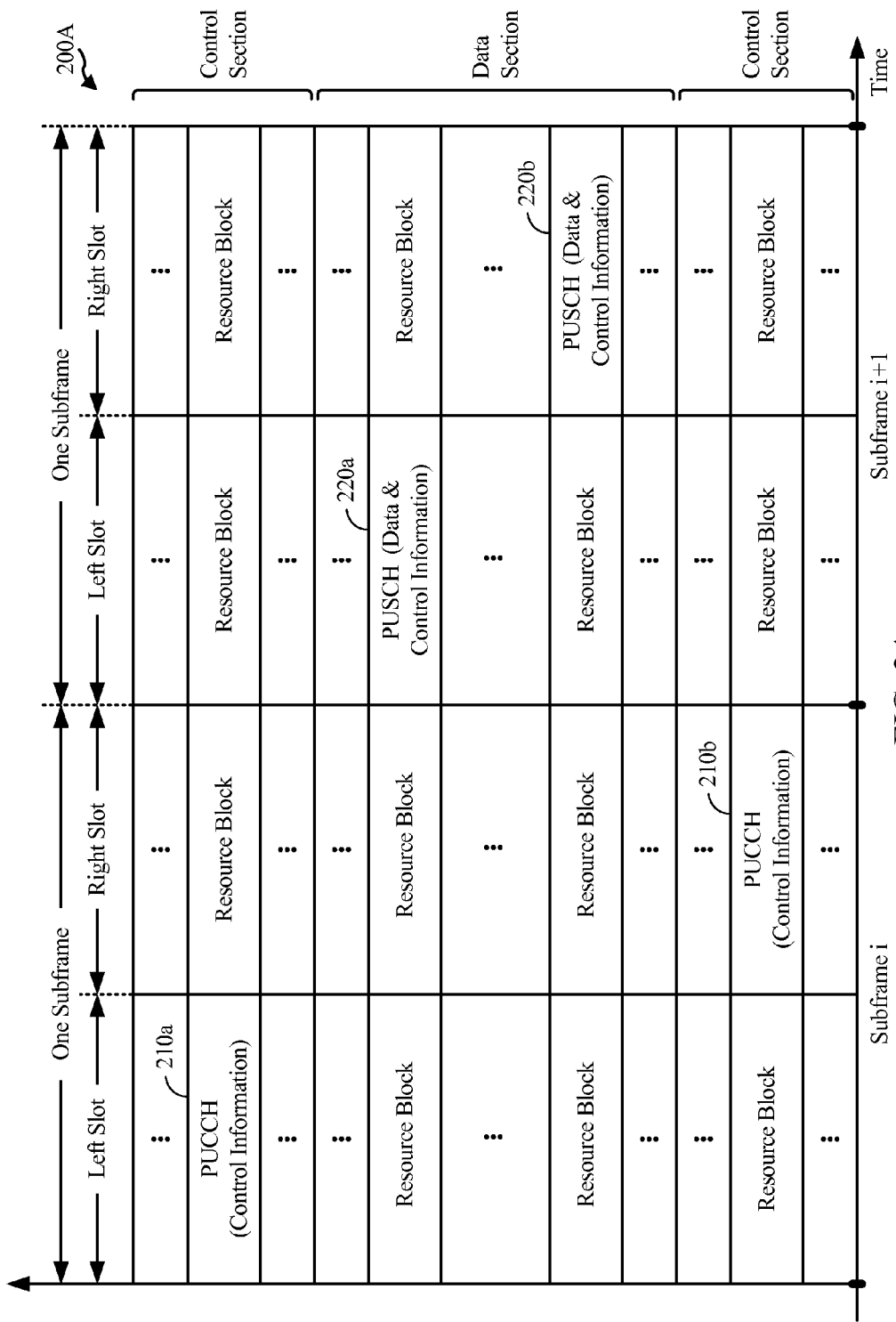
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

Aspects of the present disclosure may be utilized during the transmission of control information on assigned resource blocks in the control section. Aspects of the present disclosure may also be utilized during the transmission of control information or data information on assigned resource blocks in the data section.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
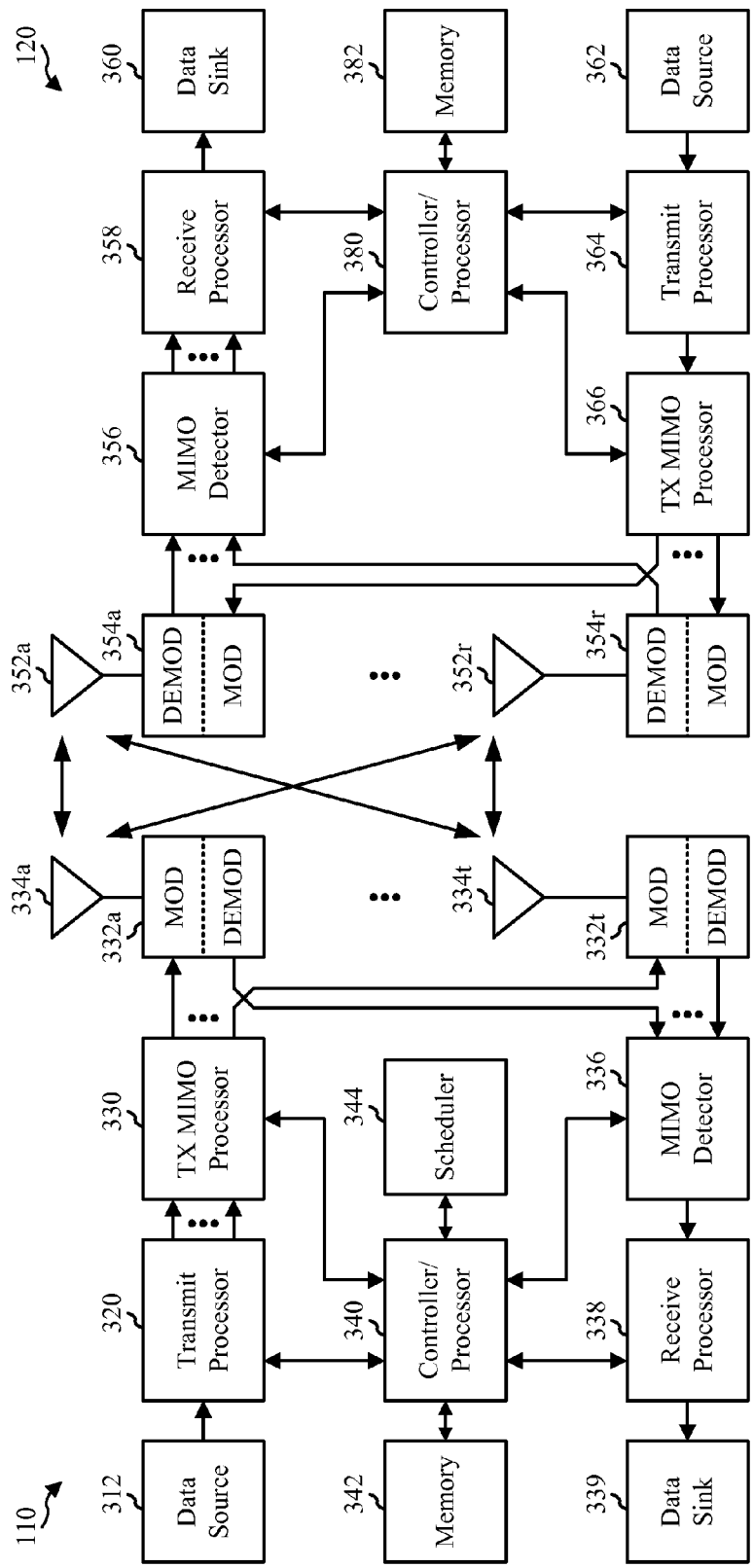
FIG. 3 illustrates an example of a Node B in communication with a user equipment (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380 to generate data symbols and control symbols. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 500 in FIG. 5 and/or other processes for the techniques described herein. The controller/processor 380, transmit processor 364, and/or other processors and modules at the UE 120 may perform or direct operations 400 in FIG. 4 and/or other processes for the techniques described herein. The memories 342 and 382 may store data and program codes for the eNB 110 and the UE 120, respectively. A scheduler 344 may schedule UEs for data transmission on the downlink and/or uplink.

Example Utilizing Uplink Sequence Shifts for Signaling

In LTE wireless communication systems, such as the system illustrated in FIG. 1, UEs may transmit sounding reference signals (SRS) and other uplink (UL) reference signals to eNBs. UL reference signals are based on Zadoff-Chu sequences when the signals are larger than 2 resource blocks (RBs), and are based on computer generated sequences (CGSs) for signals of 1 or 2 RBs. For example, if a UE, such as UE 120 in FIG. 1, receives an assignment of 4 RBs to use for transmission and determines to transmit a SRS in the 4 RBs, the UE may use a Zadoff-Chu sequence to generate the SRS. In the example, if the assignment is only 2 RBs, the UE may use a CGS to generate the SRS. Additionally, group hopping, sequence-shifting and sequence hopping are supported in UL reference signals.

Group hopping, sequence-shifting, and sequence hopping are described in 3GPP TS 36.211, entitled "Evolved Universal Terrestrial Radio Access (E-UTRA); Physical Channels and Modulation," which is publicly available.

UEs may embed demodulation reference signals (DM-RS) in the physical uplink control channels (PUCCH) and physical uplink shared channels (PUSCH) they transmit to provide a phase reference for demodulation of the PUCCH or PUSCH signals. DM-RS are also described in 3GPP TS 36.211, entitled "Evolved Universal Terrestrial Radio Access (E-UTRA); Physical Channels and Modulation," which is publicly available. DM-RS transmitted by a UE may be cyclically shifted based on commands transmitted by the UE's serving eNB and other parameters. There may be, for example, a total of twelve possible cyclic shifts of a DM-RS. The cyclic shift of a DM-RS to be transmitted by a UE may be indicated to the UE (e.g., from a serving eNB) by any suitable signaling mechanism or combination of signaling mechanisms.

According to certain aspects, the cyclic shift of a DM-RS to be transmitted by a UE may be indicated to the UE by use of the parameter n_DM-RS_1, which may be a cyclic shift parameter provided by higher layer signaling (e.g., RRC signaling). For example, an eNB may use RRC signaling to indicate that a UE should transmit DM-RS using cyclic shift 2.

According to certain aspects, the cyclic shift of a DM-RS to be transmitted by a UE may be indicated to the UE by use of the parameter n_DM-RS_2, which may be a cyclic shift parameter provided by a most recent downlink control information (DCI) scheduling the UL transmission. For example, a PDCCH transmitted to a UE may convey a DCI including a scheduling grant which sets n_DM-RS_2 to a value (e.g., 3) indicating the cyclic shift to be used by the UE when transmitting DM-RS in the granted transmission resources.

According to certain aspects, the cyclic shift of a DM-RS to be transmitted by a UE may be indicated to the UE by a pseudo-random noise (PN) sequence generated by a cell. For example, a cell may generate a PN sequence and transmit the PN sequence to indicate an additional cell specific shift to be used by the cell's served UEs.

Additionally, the sounding reference signal (SRS) channel may utilize odd and even combs, i.e. transmission on odd and even tones within the RB assigned for transmitting an SRS. For example, a UE may be assigned 1 RB in each of two subframes for transmitting SRS, and may transmit a SRS on tones 0, 2, 4, 6, 8, and 10 of the RB in the first subframe, and transmit a SRS on tones 1, 3, 5, 7, 9, and 11 of the RB in the second subframe.

Several formats are defined for PUCCH transmission. PUCCH formats 1, 1a, and 1b are used for scheduling requests (SR) and acknowledgements (ACK). PUCCH format 2 is used for channel quality indication (CQI). PUCCH formats 2a and 2b are used for both ACK and CQI, and PUCCH format 3 is used for large PUCCH payloads. PUCCH formats are described in 3GPP TS 36.211, entitled "Evolved Universal Terrestrial Radio Access (E-UTRA); Physical Channels and Modulation," which is publicly available.

For certain PUCCH formats (e.g., 1/1a/1b/2/2a/2b), a UE may spread the PUCCH using a cyclically shifted computer generated sequence (CGS). The UE may be signaled the CGS and cyclic shift to use by the serving eNB. CGS may be used with up to twelve cyclic shifts, numbered from 0 to 11. For example, an eNB may assign cyclic shift 0 to a first served UE and cyclic shift 6 to a second served UE. In the example, the first UE may transmit a PUCCH of format 1a spread with the CGS using cyclic shift 0, the receiving eNB may despread the received signal with CGS using cyclic shift 0, and the eNB may determine that the PUCCH came from the first UE because the despreading with CGS using cyclic shift 0 was successful.

For PUCCH format 3, modulation symbols are spread with an orthogonal sequence before SC-FDMA waveform generation. For example, an eNB may request a UE to transmit an aperiodic CSI report and assign cyclic shift 4 of an orthogonal sequence to the UE for transmitting the aperiodic CSI report. In the example, the UE may generate the aperiodic CSI report, format the report as part of a PUCCH of format 3, and generate modulation symbols from the PUCCH. In the example, the UE may then spread the modulation symbols using cyclic shift 4 of the assigned orthogonal sequence before generating a SC-FDMA waveform from the modulation symbols.

In addition, when transmitting a PUCCH of format 1, 1a, or 1b, an additional orthogonal code may be used. The additional orthogonal code may be indicated by any suitable signaling mechanism or combination of signaling mechanisms.

According to certain aspects, a UE may spread three pilot symbols in each slot of a subframe when transmitting a PUCCH of format 1, 1a, or 1b. The UE may spread the three pilot symbols using discrete Fourier transform (DFT) size 3 spreading. The UE may receive an indication of which DFT of size 3 to use in spreading the three pilot symbols. For example, an eNB may transmit RRC signaling indicating that a UE should spread pilot symbols in a PUCCH of format 1, 1a, or 1b using a first DFT of size 3.

According to certain aspects, a UE may spread four data symbols in each slot of a subframe when transmitting a PUCCH of format 1, 1a, or 1b. The UE may spread the three data symbols using Walsh cover sequences. The UE may receive an indication of which Walsh cover sequences to use in spreading the four data symbols. For example, an eNB may transmit RRC signaling indicating that a UE should spread data symbols in a PUCCH of format 1, 1a, or 1b using a first Walsh cover sequence.

In LTE wireless communications systems, up to 12 users can be supported for PUCCH format 2/2a/2b (e.g., by assigning a different cyclic shift to each user) and up to 36 users can be supported for format 1/1a/1b (e.g., by assigning a different combination of cyclic shift and DFT to each user). In practice, fewer users are supported so that adjacent cyclic shifts are not used, in order to reduce interference between transmitting UEs.

Techniques for use of low-cost machine type communications (MTC) UEs with LTE wireless communications systems, such as the system illustrated in FIG. 1, are described in aspects of the present disclosure. In contrast to standard UEs, low-cost MTC UEs may have reduced maximum bandwidth, a single receive RF chain, lower peak data rates, reduced transmit power, and half duplex operation. Some UEs may be considered machine type communication (MTC) UEs, which may include remote devices such as sensors, meters, location tags, etc.

According to certain aspects of the present disclosure, a user equipment (e.g., an MTC device) may use resources (that would otherwise remain unused) to convey or signal information to a base station (e.g., an eNB). In other words, the information may be encoded in the actual selection of the resources, implicitly conveyed, instead of being explicitly conveyed as one or more bits encoded in the modulation symbols of the transmission. As an example, two bits of information may be encoded by the selection of a particular resource from a set of four different resources. The base station may be able to interpret this information, for example, based on a mapping of the selected resources to different values of the information.

For example, with regard to UL transmissions, if there is partial loading in a cell (i.e., less than a maximum number of UEs will be transmitting during a particular time interval), a base station (e.g., an eNB) may not need to assign certain resources to UEs served by that base station. In such cases, remaining resources (i.e., resources the base station did not need to assign), such as unused shifts or unused orthogonal covers, may be used to (implicitly) convey information or for signaling, in accordance with certain aspects of the present disclosure.

According to certain aspects, persistent scheduling is used with MTC. Use of persistent scheduling with MTC may save transmission and scheduling overhead in comparison to using dynamic scheduling with MTC. According to certain aspects of the present disclosure, MTC devices may autonomously select data rates to use when transmitting to base stations, based on the traffic needs of the MTC devices. By autonomously selecting data rates, MTC devices may address the issue of payload size changes, because an MTC device can increase the MTC device's transmit data rate to transmit a larger payload or decrease its transmit data rate to transmit a smaller payload without requiring a change to the MTC device's persistently scheduled transmission resources. In cases where the MTC devices select their own rates, an MTC device may also need to signal the serving eNB the rate selected by the MTC device. Otherwise, the serving eNB will need to perform blind detection to determine the selected rate and receive the transmission from the MTC device.

In a first scheme for utilizing UL sequence shifts for signaling, if there are resources of DM-RS shifts, PUCCH shifts, orthogonal cover codes (OCC) or SRS available (i.e., not already assigned to a UE) in a cell, an eNB can assign some of those remaining resources to a UE scheduled for transmission, in addition to resources the eNB assigns to the UE when scheduling the UE for transmission. As a result, a particular selection from these resources by the UE may be used to convey information to the eNB.

According to certain aspects of the present disclosure, a wide variety of information may be signaled, such as information regarding interference, information regarding antenna configuration, channel state information (CSI), information regarding a preferred TDD configuration, information regarding node detection, power level information, bundle size information (if multiple transmission time interval (TTI) bundling sizes are supported), redundancy version (RV) information, or transmission data rates.

According to certain aspects, when conveying (i.e., signaling) information regarding interference, selecting a particular resource may convey changes in DL interference conditions. For example, an eNB may assign cyclic shifts 0 and 1 to a UE, and the UE may transmit a PUCCH using cyclic shift 0 to convey a decrease or no change in DL interference. In the example, the UE may convey an increase in DL interference conditions by transmitting the PUCCH using cyclic shift 1.

According to certain aspects, selecting a particular resource may convey conditions regarding enhanced interference mitigation and traffic adaptation (eIMTA), such as interference being received from a nearby UE. For example, an eNB may assign cyclic shifts 0 and 1 to a UE, and the UE may transmit a PUCCH using cyclic shift 0 to convey little or no interference is being received from a nearby UE. In the example, the UE may convey interference is being received from a nearby UE by transmitting the PUCCH using cyclic shift 1.

According to certain aspects, when conveying (i.e., signaling) information regarding antenna information, selecting a particular resource may convey a UE's transmission antenna index, if antenna selection diversity is used. For example, an eNB may assign cyclic shifts 2 and 3 to a UE, and the UE may transmit a PUCCH using cyclic shift 2 to convey the UE is using transmission antenna index 0. In the example, the UE may convey the UE is using transmission antenna index 1 by transmitting the PUCCH using cyclic shift 3.

According to certain aspects, selecting a particular resource may convey the number of receive/transmit antennas used, if the number of antennas may be adapted by the UE. For example, a UE may adapt the number of antennas the UE uses to support particular wireless protocols, e.g. LTE vs. WiFi vs. carrier aggregation (CA), etc. In the example, an eNB may assign cyclic shifts 2 and 3 to a UE, and the UE may convey the UE has 4 antennas receiving LTE by transmitting DM-RS using cyclic shift 2, or 2 antennas receiving LTE and 2 antennas receiving WiFi by transmitting DM-RS using cyclic shift 3.

According to certain aspects, selecting a particular resource when signaling CSI reporting may convey (i.e., signal) a rank information change and/or subband preference. For example, an eNB may assign cyclic shifts 2, 3, and 4 to a UE, and the UE may convey a preference that the rank used by the eNB to transmit to the UE be decreased by transmitting a CSI report using cyclic shift 2. In the example, the UE may convey a preference that the rank used by the eNB to transmit to the UE be increased by transmitting a CSI report using cyclic shift 3, or the UE may convey a preference that the rank remain unchanged by transmitting a CSI report using cyclic shift 4.

According to certain aspects, selecting a particular resource may convey (i.e., signal) a preferred TDD configuration. This is may be especially useful for eIMTA. For example, an eNB may assign cyclic shifts 2 and 3 to a UE, and the UE may convey a preference for a TDD configuration with maximal DL subframes by transmitting a PUCCH using cyclic shift 2. In the example, the UE may convey a preference for a TDD with minimal DL subframes by transmitting a PUCCH using cyclic shift 3. TDD configurations are described in 3GPP TS 36.211, entitled "Evolved Universal Terrestrial Radio Access (E-UTRA); Physical Channels and Modulation," which is publicly available.

According to certain aspects, selecting a particular resource may convey (i.e., signal) the detection of a nearby node in small cell operation, or convey the detection of a nearby device in device-to-device (D2D) operation. For example, an eNB may assign cyclic shifts 0 and 1 to a UE, and the UE may transmit a PUCCH using cyclic shift 0 to convey that a UE has detected a small cell (e.g., a femto node) nearby, while the UE may convey that the UE has not detected a small cell nearby by transmitting a PUCCH using cyclic shift 1.

According to certain aspects, selecting a particular resource may convey a UE's preference for power saving or whether a UE is at maximum power. For example, an eNB may assign cyclic shifts 2 and 3 to a UE, and the UE may convey a preference for operating in a power-saving mode by transmitting a PUCCH using cyclic shift 2, while the UE may convey a preference for operating in a non-power-saving mode by transmitting a PUCCH using cyclic shift 3. In a second example, an eNB may assign cyclic shifts 0 and 1 to a UE, and the UE may transmit a PUCCH using cyclic shift 0 to convey the UE is transmitting at maximum power and cannot increase its transmit power, while transmitting the PUCCH using cyclic shift 1 may convey the UE can increase its transmit power.

According to certain aspects, selecting a particular resource may also signal a traffic to pilot ratio (TPR) if a different TPR will be used. For example, an eNB may assign cyclic shifts 2, 3, and 4 to a UE, and the UE may convey that the UE will not change TPR by transmitting a DM-RS using cyclic shift 2. In the example, the UE may convey that the UE will increase the TPR to a next higher TPR by transmitting a DM-RS using cyclic shift 3, and the UE may convey that the UE will decrease the TPR to a next lower TPR by transmitting a DM-RS using cyclic shift 4.

According to certain aspects, when multiple TTI bundling sizes are supported, selecting a particular resource may convey (i.e., signal) a particular TTI bundling size. This bundling size may be applicable to PUSCH TTI bundling and/or PUCCH TTI bundling if they are supported, e.g. for MTC. For example, selecting a first resource may convey the UE will be transmitting with a TTI bundling size of two, while selecting a second resource may convey the UE will be transmitting with a TTI bundling size of four.

According to certain aspects, selecting a particular resource may convey the RV of an uplink transmission, if the transmission does not follow a standard RV sequence (e.g., 0, 2, 3, 1). For example, an eNB may assign cyclic shifts 2 and 3 to a UE, and the UE may convey that the RV of a transmission is following a standard RV sequence by transmitting using cyclic shift 2, while the UE may convey that the UE has skipped one entry of the sequence (e.g., the uplink transmission might normally be RV 2, but the UE has skipped RV 2 and the uplink transmission is RV 3) by transmitting using cyclic shift 3.

According to aspects of the present disclosure, there are multiple options for signaling the mapping of the shifts (or other types of resources) to the information being conveyed or signaled by the shifts, so that a serving eNB correctly interprets the signal sent by the UE by a particular resource selection.

According to certain aspects, upper layer signaling indicates the mapping of shifts to information being conveyed or signaled by the shifts. For example, an eNB may use RRC signaling to indicate that a UE may convey or signal a particular antenna configuration by transmitting a PUCCH using cyclic shift 0, and the UE may signal a different antenna configuration by transmitting a PUCCH using cyclic shift 1.

According to certain aspects, a signal in the initial grant of the persistent signaling maps the shifts to the information being conveyed or signaled by the shifts. For example, an eNB may indicate in a semi-persistent grant to a UE that the UE may signal the eNB that the UE can receive rank 2 transmissions by transmitting a PUCCH on the semi-persistently granted resources using cyclic shift 0, and that the UE may signal the eNB that the UE can receive rank 1 transmissions by transmitting a PUCCH on the semi-persistently granted resources using cyclic shift 1.

According to certain aspects, an eNB may use dynamic signaling to indicate the mapping of the shifts to the information being conveyed or signaled by the shifts. For example, an eNB may indicate in a PDCCH that a UE may signal the eNB that the UE will decrease TPR by transmitting a PUCCH using cyclic shift 0, and that the UE may signal the eNB that the UE will increase TPR by transmitting a PUCCH using cyclic shift 1.

According to certain aspects, the mapping of the shifts to the information conveyed or signaled by the shifts may be statically specified (e.g., predefined) in a communications specification. For example, a specification may specify that a UE can be assigned two cyclic shifts, and the UE signals detection of a nearby small cell by using the first assigned cyclic shift and signals that no small cells are detected by using the second assigned cyclic shift. In the example, if an eNB assigned two cyclic shifts to a served UE, the UE would transmit using the first cyclic shift if the UE detected a nearby small cell, and the receiving eNB would determine that the UE detected a nearby small cell based on detecting that the transmission was transmitted using the first cyclic shift.

Figure 4:
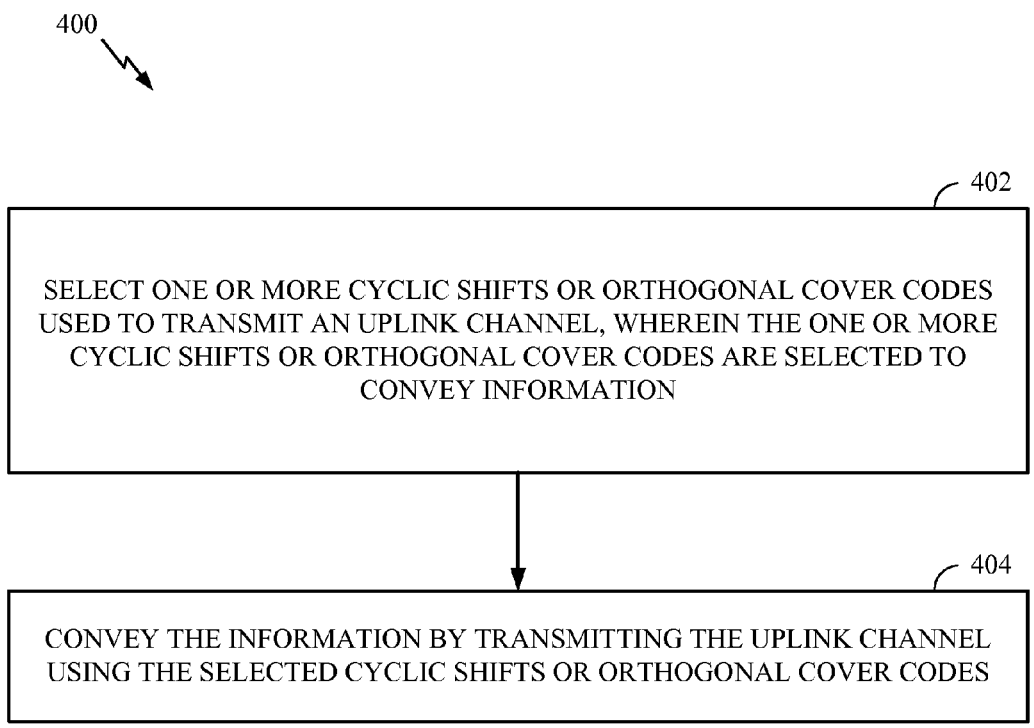
FIG. 4 illustrates example operations that may be performed by a user equipment (UE), in accordance with certain aspects of the present disclosure.

FIG. 4 illustrates example operations 400 that may be performed by a user equipment, in accordance with certain aspects of the present disclosure. At 402, the UE may select one or more cyclic shifts or orthogonal cover codes used to transmit an uplink channel, wherein the one or more cyclic shifts or orthogonal cover codes are selected to convey information. At 404, the UE may convey the information by transmitting the uplink channel using the selected cyclic shifts or orthogonal cover codes.

Figure 5:
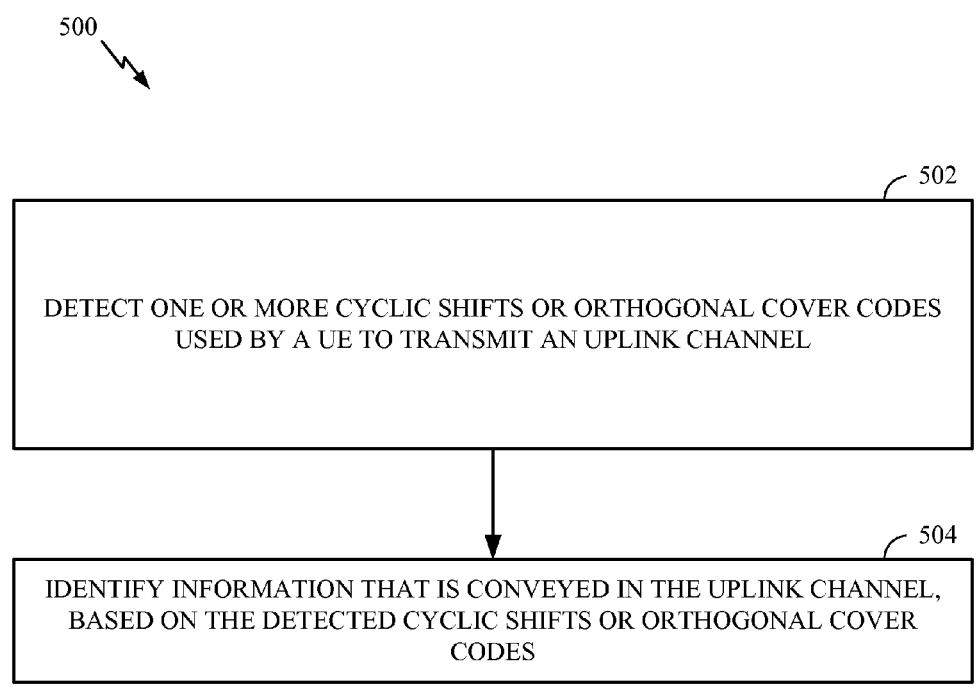
FIG. 5 illustrates example operations that may be performed by a base station (BS), in accordance with certain aspects of the present disclosure.

FIG. 5 illustrates example operations 500 that may be performed by a base station (BS), in accordance with certain aspects of the present disclosure. The operations 500 may be complementary to the operations 400 performed by a UE. At 502, the BS may detect one or more cyclic shifts or orthogonal cover codes used by a UE to transmit an uplink channel. At 504, the eNB may identify information that is conveyed in the uplink channel, based on the detected cyclic shifts or orthogonal cover codes.

According to certain aspects, an eNB can save PDCCH/ePDCCH dynamic signaling overhead by using persistent assignments. When using persistent assignments, a UE may be allowed to select transmission rates for UL transmissions in the persistently assigned transmission resources, e.g. based on payload sizes. For example, the UE may keep the same RB size as assigned in the persistent assignment and change the modulation and coding scheme (MCS) according to payload size (e.g., using a MCS that conveys data at a faster rate when the UE has more data to transmit). In a second scheme for utilizing UL sequence shifts for conveying (i.e. signaling) information, a UE may signal the selected transmission rate and/or modulation and coding scheme (MCS) by transmitting a particular shift. The set of rates that the UE may select may be provided by the initial assignments such that the number of blind decodes performed by an eNB when receiving data from the UE may be limited to the set of rates provided in the initial assignment.

According to certain aspects, unused DM-RS may be mapped to different rates, i.e. selection of a particular DM-RS pattern conveys selection of a corresponding rate. For example, a UE may convey (i.e., signal) a first transmission rate by transmitting a DM-RS using a first cyclic shift of the DM-RS sequence, and the UE may convey or signal a second transmission rate by transmitting a DM-RS using a second cyclic shift of the DM-RS sequence. In the example, the UE may have been provided a mapping of two transmission rates to two DM-RS cyclic shifts in a semi-persistent grant from a serving eNB.

According to certain aspects, a UE may select a transmission rate depending on a traffic requirement. A UE may apply different DM-RS shifts and/or orthogonal cover codes (OCC) to an UL transmission in order to convey or signal the selected transmission rate. For example, a UE may convey or signal that the UE is transmitting an UL transmission with a first transmission rate by applying a first DM-RS cyclic shift and first OCC to the UL transmission. In the example, the UE may signal a second transmission rate by using the first DM-RS cyclic shift and a second OCC, a third transmission rate by using a second DM-RS cyclic shift and the first OCC, and a fourth transmission rate by using the second DM-RS cyclic shift and second OCC.

According to certain aspects, selecting a different shift and/or a different OCC may implicitly indicate a different virtual cell identifier (VCI). For example, an eNB may assign cyclic shifts 2 and 3 to a UE, and the UE may convey a PUSCH is directed to a cell's first virtual cell identifier by transmitting the PUSCH using cyclic shift 2, and the UE may convey a PUSCH is directed to a cell's second virtual cell identifier (e.g., a VCI associated with coordinated multi-point (CoMP) operations) associated with the cell by transmitting the PUSCH using cyclic shift 3.

According to certain aspects, selecting a different shift and/or a different OCC conveys selection of a coding type, e.g. tail-biting convolution coding (TBCC) or turbo coding (TC). For example, an eNB may assign cyclic shifts 0 and 1 to a UE, and the UE may convey (i.e., signal) that an UL transmission uses TBCC by transmitting a DM-RS using a cyclic shift 0 in the UL transmission. In the example, the UE may signal that an UL transmission uses TC by transmitting a DM-RS using a cyclic shift 1 in the UL transmission.

According to certain aspects, if multi-user multiple-input multiple-output (MU-MIMO) operation is not supported by the cell, then shifts reserved for MU-MIMO may not be used for MU-MIMO and an eNB can signal a UE to use one or more of the unused MU-MIMO shifts to convey or signal the rate being used by the UE. For example, an eNB that is not supporting MU-MIMO in a cell may signal to a UE that the UE can signal use of a first transmission rate by transmitting using a first MU-MIMO shift, and the UE can signal use of a second transmission rate by transmitting using a second MU-MIMO shift.

According to certain aspects, if MU-MIMO is supported by the cell, an eNB can assign unused (i.e., not assigned to MU-MIMO capable UEs) MU-MIMO shifts to a UE for the UE to convey or signal the rate being used. For example, an eNB supporting MU-MIMO can assign a MU-MIMO shift to a UE when the UE first connects to the eNB. In the example, the eNB can signal the UE that the UE can convey use of a first transmission rate by transmitting with the assigned MU-MIMO shift, and the eNB can signal the UE to convey use of a second transmission rate by transmitting with a second MU-MIMO shift that the eNB has not assigned to any other UE.

According to certain aspects, if HARQ is supported in UL autonomous rate selection, the same rate indication can be used in re-transmission, although the UE may be using a different cyclic shift due to the fact that cyclic shift is a function of subframe. For example, a UE may be assigned cyclic shifts 0, 1, and 2 corresponding to rates A, B, and C during a subframe and may transmit using cyclic shift 1 to convey (i.e., signal) that the UE used rate B for transmitting. In the example, the UE may receive a negative acknowledgment (NAK) from an eNB and be required to retransmit the data in another subframe. In the example, the UE may be assigned cyclic shifts 4, 5, and 6 in the other subframe, and the UE may transmit using cyclic shift 5 in order to convey or signal that the UE used rate B for the retransmission.

According to certain aspects, if HARQ is supported in UL autonomous rate selection, the rate indication may only be applicable for new transmissions, e.g. when the new data indicator (NDI) is active or set in a transmission. For example, a UE may be assigned cyclic shifts 0, 1, and 2 during a first subframe and may transmit a PUSCH with the NDI set using cyclic shift 1 to convey a particular rate used for transmitting the PUSCH. In the example, the UE may receive a negative acknowledgment (NAK) from an eNB and be required to retransmit the PUSCH in a second subframe. In the example, the UE may be assigned cyclic shifts 4, 5, and 6 in the second subframe, and the UE may retransmit the PUSCH using cyclic shift 4 with the NDI not set and using the same rate that the UE used in the first subframe. In the example, the eNB may detect that the NDI is not set and receive the retransmission using the same rate as the UE used in the first subframe, regardless of the cyclic shift the UE used in transmitting in the second subframe.

According to certain aspects, an eNB may provide a persistent assignment of resource blocks (RB) and a set of modulation and coding schemes (MCS) to a UE. The eNB may also provide a mapping of DM-RS shifts and/or OCC to MCS to the UE. For example, an eNB may transmit a persistent assignment to a UE, scheduling the UE to transmit on subframe 4 of every even-numbered frame using MCS 2 or 3. In the example, the eNB may transmit a mapping indicating the UE should use DM-RS shift 3 when using the first MCS in the persistent assignment, and DM-RS shift 4 when using the second MCS in the persistent assignment. In the example, the UE may transmit a PUSCH in subframe 4 of frame 202 and convey it is transmitting using MCS 2 by transmitting a DM-RS using shift 3, and the UE may convey it is transmitting using MCS 3 by transmitting a DM-RS using shift 4.

According to certain aspects, a rate set (i.e., a set of MCS) and shifts (e.g., DM-RS shifts and/or OCC) mapping may be signaled between an eNB and a UE by upper layer signaling. For example, an eNB may signal a rate set and shifts mapping to a UE by RRC signaling.

According to certain aspects, a rate set and shifts mapping may be signaled between an eNB and a UE by the initial grant of persistent signaling. For example, an eNB may transmit a PDSCH conveying a semi-persistent scheduling grant to a UE, and the grant may include a rate set and shifts mapping.

According to certain aspects, a rate set and shifts mapping may be signaled between an eNB and a UE by dynamic signaling. For example, an eNB may transmit a PDCCH conveying a grant to a UE, and the PDCCH may include a rate set and shifts mapping. In a second example, an eNB may convey a semi-persistent scheduling grant to a UE, and transmit a PDCCH including a rate set and shifts mapping applicable to the semi-persistent grant at one or more later times.

The first and second proposed schemes described above may be individually or jointly supported by a communication system to enhance uplink signaling. For example, a communication system may implement the first scheme to convey information regarding detection of small cells for all served UEs, and, after a MTC device connects to the system, begin using the second scheme (i.e., rate set and shifts mapping) for use by MTC devices.

According to certain aspects, enabling of such features can be done on a per UE basis or per cell basis. The signaling can thus be UE-specific or cell-specific (e.g., via broadcast or dedicated signaling). For example, a cell may assign four shifts to a first UE to allow the first UE to convey or signal selection of one of four rates, and the cell may assign two shifts to a second UE to allow the second UE to convey or signal selection of one of two rates.

The various operations of methods described above may be performed by various hardware and/or software/firmware component(s) and/or module(s) corresponding to means-plus-function blocks illustrated in the Figures. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software/firmware module executed by a processor, or in a combination thereof. A software/firmware module may reside in any form of storage medium that is known in the art. Some examples of storage media that may be used include random access memory (RAM), read only memory (ROM), flash memory, EPROM memory, EEPROM memory, phase change memory (PCM), registers, a hard disk, a removable disk, a CD-ROM and so forth. A software/firmware module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software/firmware, or combinations thereof. If implemented in software/firmware, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software/firmware instructions may also be transmitted over a transmission medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a user equipment (UE), comprising:
   selecting one or more cyclic shifts or orthogonal cover codes used to transmit an uplink channel, wherein the one or more cyclic shifts or orthogonal cover codes are selected to convey information comprising information regarding selection of antennas of the UE, wherein the information regarding the selection of antennas of the UE comprises information regarding a number of antennas utilized by the UE for a particular wireless protocol; and
   conveying the information by transmitting the uplink channel using the selected cyclic shifts or orthogonal cover codes.

2. The method of claim 1, wherein the cyclic shifts or orthogonal cover codes are selected to implicitly convey information that is not explicitly conveyed in the uplink channel.

3. The method of claim 1, wherein the selecting comprises selecting a combination of at least one cyclic shift and at least one orthogonal cover code.

4. The method of claim 1, wherein the information further comprises information regarding interference conditions at the UE.

5. The method of claim 1, wherein the information further comprises information regarding a change in interference conditions at the UE.

6. The method of claim 1, wherein the information further comprises information regarding channel state information (CSI).

7. The method of claim 1, wherein the information further comprises information regarding a preferred time division duplex (TDD) configuration.

8. The method of claim 1, wherein the information further comprises information regarding detection of a node.

9. The method of claim 1, wherein the information further comprises information regarding a transmission power level.

10. The method of claim 9, wherein the information further comprises information regarding a traffic to pilot ratio (TPR).

11. The method of claim 1, wherein the information further comprises information regarding a transmission time interval (TTI) bundle size.

12. The method of claim 1, wherein the information further comprises information regarding a redundancy version (RV) of an uplink (UL) transmission.

13. The method of claim 1, wherein the selecting comprises referring to a mapping of cyclic shifts or orthogonal cover codes to corresponding information.

14. The method of claim 13, further comprising:
    receiving signaling indicating the mapping from a base station.

15. The method of claim 14, wherein the signaling comprises upper layer signaling.

16. The method of claim 14, wherein the signaling comprises signaling via an initial grant of persistent or semi-persistent resources.

17. The method of claim 13, wherein the mapping is predefined.

18. The method of claim 1, wherein the information further comprises information regarding a transmission rate selected by the UE.

19. The method of claim 1, wherein the information further comprises information regarding a virtual cell identifier (VCI).

20. The method of claim 1, wherein the information further comprises information regarding a particular coding type selected by the UE.

21. The method of claim 1, wherein the cyclic shifts or orthogonal cover codes comprise at least one of a demodulation reference signal (DM-RS) cyclic shift or a physical uplink control channel (PUCCH) cyclic shift.

22. The method of claim 1, wherein the uplink channel comprises a sounding reference signal (SRS).

23. An apparatus for wireless communications by a user equipment (UE) comprising:
    means for selecting one or more cyclic shifts or orthogonal cover codes used to transmit an uplink channel, wherein the one or more cyclic shifts or orthogonal cover codes are selected to convey information comprising information regarding selection of antennas of the UE, wherein the information regarding the selection of antennas of the UE comprises information regarding a number of antennas utilized by the UE for a particular wireless protocol; and
    means for conveying the information by transmitting the uplink channel using the selected cyclic shifts or orthogonal cover codes.

24. The apparatus of claim 23, wherein the cyclic shifts or orthogonal cover codes are selected to implicitly convey information that is not explicitly conveyed in the uplink channel.

25. An apparatus for wireless communications by a user equipment (UE), comprising:
    at least one processor configured to select one or more cyclic shifts or orthogonal cover codes used to transmit an uplink channel, wherein the one or more cyclic shifts or orthogonal cover codes are selected to convey information comprising information regarding selection of antennas of the UE, wherein the information regarding the selection of antennas of the UE comprises information regarding a number of antennas utilized by the UE for a particular wireless protocol, and convey the information by transmitting the uplink channel using the selected cyclic shifts or orthogonal cover codes; and
a memory coupled with the at least one processor.

26. The apparatus of claim 25, wherein the cyclic shifts or orthogonal cover codes are selected to implicitly convey information that is not explicitly conveyed in the uplink channel.

27. A non-transitory computer readable medium for wireless communications by a user equipment (UE), comprising instructions stored thereon for:
selecting one or more cyclic shifts or orthogonal cover codes used to transmit an uplink channel, wherein the one or more cyclic shifts or orthogonal cover codes are selected to convey information comprising information regarding selection of antennas of the UE, wherein the information regarding the selection of antennas of the UE comprises information regarding a number of antennas utilized by the UE for a particular wireless protocol; and
conveying the information by transmitting the uplink channel using the selected cyclic shifts or orthogonal cover codes.

28. The non-transitory computer readable medium of claim 27, wherein the cyclic shifts or orthogonal cover codes are selected to implicitly convey information that is not explicitly conveyed in the uplink channel.

* * * * *